United States Patent Office 2,775,568
Patented Dec. 25, 1956

2,775,568

RUBBERY POLYMERS PLASTICIZED WITH THIO DERIVATIVES OF POLYCHLOROBENZENES

Friedrich Lober, Otto Bayer, and Max Bögemann, Leverkusen-Bayerwerk, and Paul Schneider, Opladen, Germany No Drawing. Original application December 27, 1950, Serial No. 207,068, now Patent No. 2,695,898, dated November 30, 1954. Divided and this application May 20, 1954, Serial No. 431,283

Claims priority, application Germany December 27, 1949

3 Claims. (Cl. 260—30.8)

The present invention relates to the plasticizing of rubber and rubber-like polymerizates and further relates to the reclaiming of their vulcanizates.

It is known that aromatic mercaptans, such as thiophenol or alkyl- and/or trihalogen substitution products thereof and thionaphthols as well as their zinc salts promote the mastication of natural rubber and synthetic rubber-like butadiene-polymers at elevated temperatures. However, these compounds possess a very unpleasant odor which is characteristic for mercaptans and, due to their more or less great volatility at the mastication temperatures usually employed, especially when simultaneously subjecting the rubber to mechanical treatment in the generally used aggregates, cause strong annoyances of the olfactory nerves and in most cases a dermatitis.

It has been found that penta-substituted thiophenols carrying at least 4 Cl-atoms in the nucleus, such as pentachloro- and tetrachloro-alkylthiophenols or the functional derivatives thereof, are excellent agents for plasticizing high polymeric plastics, such as unvulcanized natural rubber or synthetic rubber-like polymerizates, and for reclaiming vulcanizates thereof. The said penta-substituted thiophenols are superior to the known aromatic mercaptans since they show an excellent plasticizing effect by which they are distinguished despite their molecular enlargement and cause only a very weak annoyance of the olfactory nerves because they are only slightly volatile. The penta-substituted thiophenols carrying at least 4 Cl-atoms in the nucleus are further distinguished by their sulfhydryl group giving a considerably weaker reaction than the thiophenols usually employed. When synthetic rubber-like butadiene polymers are plasticized with thiophenols by subjecting the polymers to a thermal treatment for a longer period than is necessary for accomplishing the desired plasticity cyclization of the polymerizates cannot be avoided. However, on using the penta-substituted thiophenols cyclization is brought about only to an immaterial degree and when the S-acyl derivatives of said penta-substituted thiophenols are employed, cyclization does not occur at all. The penta-substituted thiophenols in the technically pure state already represent odorless compounds which give the known mercaptan reactions and are readily soluble in aromatic hydrocarbons. The functional derivatives of the said thiophenols which are capable of reforming the penta-substituted thiophenols by reduction, hydrolysis, or by disproportioning in the mastication are equally suited.

Another advantage of the new penta-substituted thiophenol plasticizers resides in the fact that they are effective at essentially lower temperatures than those applied when operating with the usual plasticizing agents. In some cases, a sufficient plasticizing effect is achieved simply at 80 to 95° C. Furthermore, the new plasticizing agents show the special advantage that the plasticizing starts almost immediately after beginning the treatment and after a short period a satisfactory plasticity is achieved. Therefore, when utilizing the plasticizers according to the present invention, plasticizing is achieved within a substantially short period. Furthermore, the new plasticizing agents which are almost odorless do not cause any health hazards e. g. skin diseases of the attendants handling therewith and are not toxic. Therefore, they are adapted for producing rubber articles intended for use in contact with foodstuffs. The fillers, antioxidants and accelerators with exception of the thiuram compounds, generally employed in the rubber industry as well as the other usual auxiliary agents do not affect the plasticizing procedure performed with the new penta- substituted thiophenol compounds.

The new plasticizing agents correspond to the general formula:

In this formula and in the following formulae R stands for $C_6Cl_5$- or $C_6Cl_4$·alk.-, alk. representing an alkyl group with 1 to 8 C-atoms or more. X stands for a member of the group consisting of

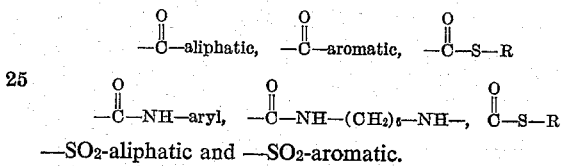

—$SO_2$-aliphatic and —$SO_2$-aromatic.

According to the present invention the following penta-substituted thiophenols or functional derivatives thereof are useful: penta-chloro-thiophenol, the zinc salt of pentachloro-thiophenol, pentachloro-thiophenyl acetic ester, pentachloro-thiophenyl propionic ester, the ester of pentachloro-thiophenol with the fatty acids of the first runnings of the paraffin oxidation, for instance, those with a carbon chain of about $C_8$ to $C_{12}$, pentachloro-thiophenyl stearic ester, pentachloro-thiophenyl oleic ester, di-S-pentachloro-phenyl - thiooxalic ester, pentachloro-thiophenyl benzoic ester, pentachloro-thiophenyl dichloro-benzoic ester, pentachloro-thiophenyl phthalic monomethyl ester, pentachloro-thiophenyl naphthalene-carboxylic ester, pentachloro-thiophenyl benzene sulfonic ester, pentachlorothiophenyl toluene sulfonic ester, the esters of pentachlorothiophenol with the alkyl sulfonic acids obtained by sulfochlorination of paraffin hydrocarbons, di-pentachlorophenyl-disulfide, di-pentachlorophenyl-trisulfide, formaldehyde - bis - pentachlorophenyl-mercaptal, acetaldehyde-bis-pentachlorophenyl-mercaptal, benzaldehyde-bis-pentachlorophenyl-mercaptal, furfurylaldehyde-bis-pentachlorophenyl-mercaptal, S-pentachlorophenyl - thioacetonitrile, N-phenyl-S-pentachlorophenyl-thiourethane, hexamethylene - di - (S-pentachloro-phenylthiourethane), di-S-pentachlorophenyl-dithio-carbonic ester, and the corresponding functional derivatives of the methyl-tetrachloro-thiophenol, ethyl-tetrachloro-thiophenol, butyl-tetrachloro-thiophenol, cyclohexyl-tetrachloro-thiophenol and isooctyltetrachloro-thiophenol. Pentachloro-thiophenol, the zinc salt of pentachloro-thiophenol, di-pentachlorophenyl-disulfide, benzoyl-pentachloro- and acetyl-pentachloro-thiophenol have proved to be especially useful in practice.

The increased plasticizing effect of the said penta-substituted thiophenols over the hitherto used aromatic mercaptans, for instance, the trichloro-thiophenol, is achieved by the substitution of the hydrogen atoms in the aromatic nucleus by chlorine or by chlorine and one alkyl, the substituents exerting an activation effect upon the mercapto group. The disulfides of the thiophenol, thionaphthol and the low chlorinated aromatic mercaptans, e. g. trichloro-thiophenols, accelerate the rate of plasticizing only to an immaterial degree. The sulfur bridge of the dipenta-substituted diphenyl-disulfides with at least 4 Cl-atoms in each nucleus, however, is loosened by complete substitution of the aromatic nucleus, to such an extent that they show in the plasticizing procedure an activity which is only slightly inferior to that of the pentachloro-thiophenol.

The new compounds according to the present invention are preferably employed in quantities of 0.1 to 0.5% for plasticizing unvulcanized natural rubber and in quantities of 0.25 to 3% for plasticizing synthetic rubber-like butadiene polymers and are equally suited for reclaiming vulcanized natural rubber and vulcanized rubber-like butadiene polymers.

The term "synthetic rubber-like butadiene polymers" shall comprise the polymerizates of butadiene or its homologues, such as isoprene and dimethyl-butadiene as well as copolymerizates of said compounds with other polymerizable compounds, for instance styrene or acrylonitrile.

The new penta-substituted thiophenol plasticizers may also be incorporated directly into the original latex as obtained from the rubber trees or into the stabilized latex ready for shipment or into the latex of the rubber-like butadiene polymers obtained by emulsion polymerization, the quantity of the new plasticizing agents being calculated on the rubber content of the latex. After coagulating and working up the latex in the usual manner the new plasticizing agent is present within the crude sheets in finely distributed form. The crude sheets are plasticized in the above described manner. Of course, the new plasticizers are applied in a very finely dispersed form and derivatives are chosen which, for instance, owing to their wettability, their specific gravity etc., provide a uniform and stable suspension within the latex. Particularly suitable derivatives for application to latex are, for instance, the free mercaptans, the di- and tri-sulfides, the S-acyl derivatives and the zinc salts. The new plasticizing agents may also be employed in combination with the known wetting agents.

The pentachloro-thiophenol may be prepared according to a known method by reacting the hexachloro benzene with alkali metal sulfides or alkali metal hydrosulfides in the presence of anhydrous lower aliphatic alcohols at temperatures between 110 and 130° C. According to the prior art process no quantitative yields are obtained owing to the formation of undesired by-products which are partially contained in the thiophenols and which can be removed therefrom only by tedious purification methods. If the alcohol contains water, pentachloro phenol is simultaneously formed by hydrolysis which can also be removed with difficulty only.

According to the present invention pure penta-substituted thiophenols adapted for use as plasticizing agents are obtained in simple manner while avoiding the above described difficulties by reacting hexa-substituted benzene containing at least 5 chlorine atoms as substituents with alkali metal disulfides in the presence of an organic solvent containing at least one alcoholic hydroxy group. The reaction proceeds smoothly at temperatures between 70 and 130° C., however, the reaction is best accomplished by applying temperatures between 80 and 100° C.

Suitable starting materials for the new process, besides hexachloro-benzene, are pentachloro-monoalkyl-benzenes wherein the alkyl group may possess preferably from 1 to 6 carbon atoms, such as, for instance, methyl, ethyl, isopropyl, isobutyl and cyclohexyl. They may also contain more than 6 carbon atoms, e. g. isooctyl.

As alkali metal disulfides may be mentioned sodium disulfide and potassium disulfide. Said disulfides are preferably reacted under anhydrous conditions. When water is present, e. g. in the alkali metal disulfides employed, the quantity of alcohol is to be increased. In order to attain a quantitative reaction of the chlorinated benzene derivatives the sodium or potassium disulfide has to be applied in excess amounting to at least the 2.7-fold quantity of the equimolar amount which—calculated on the hexa-substituted benzene—is required for the formation of the bis-penta-substituted phenyl disulfide.

As organic solvents containing at least one alcoholic hydroxyl group, the lower aliphatic and cycloaliphatic alcohols, such as menthanol, ethanol, propanol, butanol and cyclohexanol may advantageously be employed. The reaction may be carried out also in polyvalent alcohols, for instance, ethylene glycol, butylene glycol or monoethers thereof, for instance, ethylene glycol monomethyl ether or butylene glycol monomethyl ether.

In the reaction performed under the above described conditions only one chlorine atom of the hexa-substituted benzene is exchanged for the mercapto group. The alkali metal salts of the thiophenols thus obtained are isolated from the solutions by removing the solvent, for instance, by distilling off or by expelling with steam. For removing impurities, if any, it is advisable to take up the residue with water wherein the sodium salts of the thiophenols dissolve and to separate off the non-dissolved ingredients, for instance, by filtering. By acidifying the aqueous solution with mineral acids e. g. HCl and $SO_2$ the free mercaptans are precipitated.

The pentachloro-thiophenol and the tetrachloro-alkylthiophenols represent crystallized, colorless and almost odorless compounds being insoluble in water, slightly soluble in ethyl alcohol and readily soluble in hot aromatic hydrocarbons and in ligroin. They are readily soluble in cold chloroform. The heavy metal salts of pentachloro-thiophenol are insoluble in water so that the mercaptans can be purified or isolated by means of these salts.

Their alkali- and alkaline-earth metal salts of the penta-substituted thiophenols are soluble in water. They are readily converted into their disulfides by means of oxidizing agents, for instance, hydrogen peroxide, chlorine or potassium ferricyanide or by means of air applied to the alkaline solution of said thiophenols. The disulfides represent weakly yellow colored crystallized compounds.

The aforesaid functional derivatives may be produced in simple manner from the pentachloro-thiophenol or tetrachloro-alkylthiophenol. The zinc salts are obtained by reaction of the sodium salts of the penta-substituted thiophenols in aqueous solution with ammoniacal zinc chloride solution. The acyl compounds may be prepared in known manner by reacting the sodium salts of the penta-substituted thiophenols with the corresponding carboxylic acid chlorides in aqueous or organic media. Acylation may also be accomplished by means of carboxylic anhydride preferably in the presence of organic tertiary bases. The thioacetals are obtained from the penta-substituted thiophenols and aldehydes or ketones in the presence of acid condensation agents, for instance, hydrochloric acid or anhydrous zinc chloride in indifferent organic solvents. The thiourethanes are preferably prepared by fusing pentachloro-thiophenol with isocyanates. The alkyl ethers may be obtained according to the conventional methods with alkylating agents, for instance, dialkylsulfates. Compounds containing reactive halogen atoms, for instance, cyanogen chloride, cyanogen bromide, chloro-acetonitrile, chloro-acetic acid, chloro-acetic ester, 2-chloro-benzotriazol, readily react with penta-substituted thiophenols. The polysulfides are obtained by introduction of sulfur; thus, for instance, trisulfide is formed by reacting penta-substituted thiophenols and sulfur dichloride.

This application is a divisional application of our application Serial No. 207,068 of December 27, 1950, now U. S. Patent No. 2,695,898 issued November 30, 1954.

The following examples illustrate the present invention without restricting it thereto, the parts being by weight.

*Example 1*

950 parts of methanol, 225 parts of 60% technical, water-containing sodium sulfide and 44 parts of sulfur are heated in a stirring autoclave at 80 to 85° C. for 2 hours. The mixture is then cooled to 55° C., mixed with 284.4 parts of hexachloro-benzene and heated at 80 to 90° C. for further 15 hours. The methanol is distilled off and the residue is taken up with water. The aqueous solution formed is sucked off while still warm, non-reacted portions of hexachloro-benzene, if any, being removed thereby. The mercaptan is quantitatively precipitated from the cold filtrate as slightly colored product in relatively pure form by addition of an aqueous solution of SO₂ or by introducing gaseous SO₂, care having to be taken that the pH-value is not smaller than 6. The preparation of a mercaptan being completely free from elementary sulfur is accomplished by desulfurizing the neutral-washed crude material with a 10% aqueous sodium sulfite solution in water at 80 to 85° C. A technically pure pentachloro-thiophenol is thus obtained in a yield of 90 to 95% referred to hexachloro-benzene. The product melts between 228 and 235° C. depending on the purity of the hexachloro-benzene employed.

In the same manner the corresponding alkyl-substituted thiophenols are obtained from pentachloro-alkyl-benzenes for instance, pentachloro-toluene and pentachloro-ethyl-benzene.

*Example 2*

282 parts of technically pure pentachloro-thiophenol are dissolved with heating to 60 to 80° C. in a solution of 41 parts of caustic soda in 2800 parts of water, the solution remaining slightly turbid by the di-pentachloro-phenyl-disulfide formed by action of air. After cooling the solution to 30 to 35° C. a solution of 335 parts of potassium ferricyanide in 850 parts of water is dropped in with good stirring, the disulfide being quantitatively obtained thereby in light-yellow, very finely divided, almost pure form. After sucking off, washing and drying the pure compound melting at 237° C. is obtained in form of coarse, orange crystals by crystallizing from chloro-benzene.

In the above reaction potassium ferricyanide may be replaced by other oxidizing agents, such as hydrogen peroxide, air or sodium hypochlorite.

*Example 3*

13 parts of sulfur dichloride at 40 to 45° C. are slowly introduced into a solution of 70.5 parts of pentachloro-thiophenol in 775 parts of carbon disulfide. The solution is stirred at 50 to 55° C. for some hours and the solvent is removed by distillation. After cooling the residue is ground with water and sucked off. After drying bis-pentachloro-phenyl-trisulfide crystallizes from hot chloro-benzene in yellow crystals melting at 192.5 to 194.5° C.

*Example 4*

564 parts of technical pentachloro-phenol or a corresponding quantity of wet pentachloro-thiophenol obtained as described in Example 1 are dissolved in a solution of 90 parts of caustic soda in 6000 parts of water at 70 to 75° C. with the exclusion of oxygen or air. Small non-dissolved portions are separated by sucking off. The clear, brown alkali salt solution of the mercaptan is mixed with good stirring at room temperature with an ammoniacal zinc-chloride solution consisting of 159.8 parts of 90% crystallized zinc-chloride, 1500 parts of water and 827 parts of ammonia (161 parts of NH₃ in 1000 parts of water). After 5 hours' stirring the finely divided precipitated zinc salt of the pentachloro-thiophenol is sucked off and freed from salt by washing with 5% ammonia and water. 574 parts of odorless and colorless zinc salt of pentachloro-thiophenol decomposing at a temperature above 345° C. with discoloration without melting are obtained. The yield calculated on pentachloro-thiophenol amounts to 96 to 97%.

*Example 5*

423 parts of technical pentachloro-thiophenol or a corresponding amount of the product in the wet state are introduced into a solution of 64 parts of caustic soda in 1200 parts of water at 65 to 75° C. with the exclusion of air. After separating off small non-dissolved portions, 147 parts of benzoyl chloride are added at room temperatures within 6 to 7 hours with stirring. After 15 hours' stirring the precipitated benzoyl compound is sucked off, thoroughly washed with a sodium bicarbonate- or sodium carbonate solution and water and dried. Thio-benzoic acid-S-pentachloro-phenyl ester melting at 137 to 139° C. is obtained as slightly colored, odorless crystalline powder in comparatively pure form in a yield of 90 to 95% calculated on pentachloro-thiophenol. After complete purification by recrystallizing from acetone or benzene the product shows a melting point of 144.5 to 145° C.

The S-acyl derivatives with aliphatic mono- or di-carboxylic acids or other aromatic carboxylic acids, for instance, acetic acid, propionic acid, the fatty acids of the first runnings in the paraffin oxidation with a carbon chain of about $C_8$ to $C_{12}$, stearic acid or oxalic acid, may be obtained in the same manner. When the reaction is carried out in an anhydrous medium in the presence of tertiary bases the anhydrides of the aforesaid carboxylic acids may also be utilized.

*Example 6*

3 kilograms of smoked sheets are masticated with the addition of the following compounds in a Werner-Pfleiderer-mixer of the GK.6-type and the plasticity is determined by test samples drawn after certain periods indicated below.

| | amount, percent | temperature, °C. | plasticity number after— | | | |
|---|---|---|---|---|---|---|
| | | | 0 minutes | 6 minutes | 8 minutes | 10 minutes |
| pentachlorothiophenol, M. P. 239° C. | 0.2 | 130 | 510 | 190 | 175 | 165 |
| 1.2.4-trichlorothiophenol (67% in hard paraffin) | 0.27 | 135 | 510 | 240 | 180 | 180 |

*Example 7*

1 kilogram of a butadiene copolymerizate obtained from 25 parts of styrene and 75 parts of butadiene is masticated on the roller at 120° C. with the addition of the following compounds and the plasticity is determined by test samples drawn after certain periods indicated below.

| | amount, percent | temperature, °C. | plasticity number after— | | |
|---|---|---|---|---|---|
| | | | 0 minutes | 4 minutes | 8 minutes |
| pentachlorothiophenol, M. P. 239° C. | 1.5 | 120 | 560 | 250 | 260 |
| 1.2.4-trichlorothiophenol (67% in hard paraffin) | 2.0 | 120 | 560 | 350 | 350 |

*Example 8*

1 kilogram of a butadiene copolymerizate obtained from 25 parts of acrylonitrile and 75 parts of butadiene are thermally plasticized in air with the addition of the following compounds under an overpressure of 3 atmospheres and the plasticity is determined by test samples drawn after certain periods indicated below.

|  | amount, percent | temperature, °C. | plasticity number after— | | |
|---|---|---|---|---|---|
|  |  |  | 0 minutes | 30 minutes | 60 minutes |
| pentachloro-thiophenol, M. P. 239° C | 3.0 | 130 | 475 | 225 | 215 |
| benzoic acid-pentachloro-thiophenylester, M. P. 131–132° C | 3.0 | 130 | 475 | 245 | 245 |
| 1.2.4-trichlorothio-phenol (67% in hard paraffin) | 4.0 | 130 | 475 | 240 | 275 |

Example 9

40 kilograms of smoked sheets are masticated in a 45-liter Banbury mixer at 130° C. with 0.25% of the following compounds and at 150° C. with 0.15% of the following compounds for 7 minutes and the plasticity is determined after this time. The crude sheet shows a plasticity number of 540.

|  | amount, percent | temperature, °C | plasticity number after 7 minutes |
|---|---|---|---|
| benzoic acid-pentachloro-thiophenyl ester | 0.25 | 130 | 340 |
|  | 0.15 | 150 | 295 |
| zinc salt of the penta-chloro-thiophenol | 0.25 | 130 | 205 |
|  | 0.15 | 150 | 165 |
| without addition |  | 130 | 380 |
| Do |  | 150 | 365 |

Example 10

3 kilograms of smoked sheets are masticated with the addition of the following compounds at the said temperatures in a Werner-Pfleiderer-mixer of the GK.6-type and the plasticity is determined by test samples drawn after certain periods indicated below.

|  | amount, percent | temperature, °C. | plasticity number after— | | | |
|---|---|---|---|---|---|---|
|  |  |  | 0 minutes | 6 minutes | 8 minutes | 10 minutes |
| acetic acid-penta-chloro-thiophenylester, M. P. 117.5–119° C | 0.2 | 123 | 635 | 280 | 220 | 155 |
| benzoic acid-pentachloro-thiophenylester, M. P. 131–132 ° C | 0.2 | 126 | 610 | 295 | 260 | 210 |
| 2.5 - dichloro - benzoic acid-pentachloro-thiophenylester, M. P. 134° C | 0.2 | 129 | 600 | 230 | 260 | 215 |
| di-pentachloro-phenyl-disulfide, M. P. 235° C | 0.2 | 129 | 610 | 380 | 295 | 250 |
| di-pentachloro-phenyl-trisulfide, M.P. 192.5–194.5° C | 0.2 | 134 | 545 | 425 | 370 | 245 |
| pentachloro-thiophenyl-phthalic acid-monomethylester, M. P. 153.5–154° C | 0.2 | 134 | 545 | 370 | 245 | 180 |

Example 11

1 kilogram of smoked sheets is masticated on the roller at 120° C. with 0.5% of the following compounds and the plasticity is determined by test samples drawn after certain periods indicated below.

|  | amount, percent | temperature, °C. | plasticity number after— | | | |
|---|---|---|---|---|---|---|
|  |  |  | 0 minutes | 4 minutes | 8 minutes | 12 minutes |
| benzenesulphonic acid-pentachloro-thiophenylester, M. P. 193–197° C | 0.5 | 120 | 545 | 280 | 180 |  |
| formaldehyde-bis-pentachloro-phenyl-mercaptal, M. P. 270° C | 0.5 | 120 | 545 | 185 | 140 | 100 |
| benzaldehyde-bis-pentachloro-phenyl-mercaptal, m. p. 108–112° C | 0.5 | 120 | 545 | 185 | 170 | 125 |

Example 12

1 kilogram of smoked sheets is masticated on the roller at 120° C. with the addition of 0.50% of the following compounds and the plasticity is determined by test samples drawn after certain periods indicated below.

|  | plasticity number after— | | | |
|---|---|---|---|---|
|  | 0 minutes | 5 minutes | 10 minutes | 15 minutes |
| ethyl-tetrachloro-phenyl mercaptan M. P. 107–109°C | 505 | 180 | 130 | 100 |
| zinc salt of the ethyl-tetra-chloro-chloro-phenyl mercaptan | 505 | 170 | 105 | 70 |
| N - phenyl - S - penta - chlorophenyl thiourethane, M. P. 172.5–174°C | 505 | 95 | 65 |  |
| hexamethylene - di - (S - pentachlorophenyl thiourethane), M. P. 186.0–188.0° C | 505 | 130 | 100 | 60 |
| di - S - pentachloro - phenyl - di - thiocarbonic ester, M. P. 227.5–228.5° C | 505 | 65 | 40 |  |
| di - S - pentachloro - phenyl - thio - oxalic ester, M. P. 258–259°C | 505 | 100 | 60 | 55 |
| S - pentachloro - phenyl - thio - acetonitrile | 505 | 205 | 145 | 125 |

Example 13

100 parts by weight of a ground vulcanizate of a copolymerizate prepared from 75 parts of butadiene and 25 parts of styrene containing about 40% of carbon black, are mixed as usual with 2 parts of pentachlorothiophenol, 3 parts of fatty tar oil, 3 parts of brown-coal tar distillate and 3 parts of an Edeleanu extraction product and treated in the reclaiming vessel with air of 3 atmospheres overpressure and steam of 4 atmospheres overpressure for 90 minutes at a temperature of about 150.° C. corresponding to the partial pressure of the steam. Highly plastic and viscous reclaimed rubber with an average plasticity number of 530 is thus obtained which, either alone or in admixture with unvulcanized rubber, can be made into vulcanizates with good mechanical properties.

Reclaimed rubber with equal properties is obtained by replacing the pentachloro-thiophenol by 2 parts of the zinc salt of pentachloro-thiophenol. 50 kilograms of first quality ribbed smoked sheets are crushed on the roller mill with cooling for 3 minutes and subsequently masticated within 30 minutes. The temperatures at the front roll and the back roll as well as the temperature of the elastomers and the plasticity number according to Williams are determined within the intervals indicated in the following table:

[Plasticity number of the non-masticated rubber: 515-30]

| Time of plasticizing | plasticity number | rubber temperature, °C. | temperature, °C. | |
|---|---|---|---|---|
| | | | front roll | back roll |
| without addition: | | | | |
| 10 | 475-172 | 93 | 45 | 46 |
| 15 | 420-153 | 98 | 42 | 43 |
| 20 | 385-90 | 95 | 40 | 40 |
| 30 | 371-58 | 92 | 38 | 36 |
| with addition of 0.25% of the zinc salt of pentachlorothiophenol: | | | | |
| 10 | 370-166 | 90 | 42 | 45 |
| 15 | 330-74 | 92 | 42 | 45 |
| 20 | 305-69 | 92 | 38 | 40 |
| 30 | 270-51 | 85 | 36 | 33 |

The acceleration of the mastication by addition of the zinc salt of pentachloro-thiophenol at temperatures below 100° C. is evident from the above figures.

*Example 15*

Two portions of 40 kilograms each of a copolymerizate of 65 parts of butadiene and 35 parts of acrylonitrile are plasticized in a 45 liter Banbury kneader for 15 minutes or 30 minutes respectively. The following plasticity numbers (values) are determined according to Williams:

[Plasticity number of the non-treated rubber: 472.]

| | Plasticizing agent—none | | 2.5% of pentachlorothiophenol | |
|---|---|---|---|---|
| Time of plasticizing | plasticity number | rubber temperature, degrees | plasticity number | rubber temperature, degrees |
| 15 | 460 | 150 | 370 | 145 |
| 30 | 425 | 150 | 310 | 142 |

We claim:
1. A plasticized elastomer selected from the group consisting of natural rubber, rubbery conjugated diene polymers and their vulcanizates, containing as a plasticizer, a compound of the general formula

$$R—S—X$$

where R stands for a penta-substituted phenyl radical of the group consisting of $C_6Cl_5-$ and $C_6Cl_4\cdot alk.-$, alk. being an alkyl group containing from 1 to 8 C atoms, and X is selected from the group consisting of

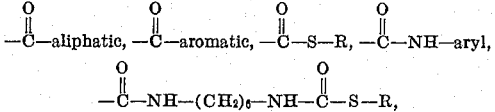

$—SO_2$-aliphatic and $—SO_2$-aromatic.

2. A plasticized elastomer selected from the group consisting of natural rubber, rubbery conjugated diene polymers and their vulcanizates, containing as a plasticizer, acetylpentachloro-thiophenol.

3. A plasticized elastomer selected from the group consisting of natural rubber, rubbery conjugated diene polymers and their vulcanizates, containing as a plasticizer, benzoyl-pentachloro-thiophenol.

References Cited in the file of this patent

UNITED STATES PATENTS

| 2,223,085 | Williams | Nov. 26, 1940 |
| 2,234,204 | Starkweather | Mar. 11, 1941 |

OTHER REFERENCES

Noller: "Chemistry of Organic Compounds," Saunders, 1951, pages 296, 297, 310–312.